(12) United States Patent
Yu et al.

(10) Patent No.: US 11,161,536 B2
(45) Date of Patent: Nov. 2, 2021

(54) EXTENSION GATE FOR TROLLEY

(71) Applicant: Zhuhai Shichang Metals Ltd., Zhuhai (CN)

(72) Inventors: Hai Yu, Zhuhai (CN); Che-Jen Wang, Zhuhai (CN)

(73) Assignee: Zhuhai Shichang Metals Ltd., Zhuhai (CN)

(*) Notice: Subject to any disclaimer, the term of this patent is extended or adjusted under 35 U.S.C. 154(b) by 0 days.

(21) Appl. No.: 16/835,491

(22) Filed: Mar. 31, 2020

(65) Prior Publication Data
US 2020/0346677 A1 Nov. 5, 2020

Related U.S. Application Data

(63) Continuation-in-part of application No. 29/718,882, filed on Dec. 30, 2019, now Pat. No. Des. 911,654, (Continued)

(30) Foreign Application Priority Data

Apr. 30, 2019 (CN) .......................... 201920617757.3
Jan. 7, 2020 (CN) ......................... 202010014510.X

(51) Int. Cl.
*B62B 3/02* (2006.01)
*B62B 3/10* (2006.01)

(52) U.S. Cl.
CPC .............. *B62B 3/025* (2013.01); *B62B 3/108* (2013.01); *B62B 2202/80* (2013.01); *B62B 2203/60* (2013.01); *B62B 2206/02* (2013.01)

(58) Field of Classification Search
CPC ........... B62B 3/025; B62B 3/108; B62B 3/10; B62B 3/02; B62B 3/002; B62B 2202/80;
(Continued)

(56) References Cited

U.S. PATENT DOCUMENTS 2,621,815 A * 12/1952 Gannon .................. B62B 3/108
414/537
8,517,398 B1 * 8/2013 Wilson ...................... B62B 1/12
280/38
(Continued)

*Primary Examiner* — John D Walters
(74) *Attorney, Agent, or Firm* — Luedeka Neely Group, P.C.

(57) ABSTRACT

A trolley configured for use to carry folding tables of a variety of sizes. The trolley includes a loading end, a trolley frame, and an extension gate adjustably connected to the trolley frame so as to be adjustable relative to the loading end of the trolley in a length direction of the trolley. The extension gate includes an elongate member slidingly disposed on the trolley frame and a rotatable portion that is foldable relative to the elongate member and lockable in an upright position by a lock. The rotatable portion may be positioned in an extended position from the loading end of the trolley, in a retracted position adjacent the loading end of the trolley, and in positions that are intermediate to the extended position and the retracted position. The elongate member may slide in a first direction to extend the rotatable portion away from the loading end of the trolley and in a second direction to retract the rotatable portion toward the loading end of the trolley.

14 Claims, 21 Drawing Sheets

Related U.S. Application Data and a continuation-in-part of application No. 29/718,885, filed on Dec. 30, 2019, now Pat. No. Des. 911,657.

(58) Field of Classification Search
CPC ............ B62B 2202/30; B62B 2203/60; B62B 2206/02

See application file for complete search history.

(56) References Cited

U.S. PATENT DOCUMENTS

| | | | |
|---|---|---|---|
| 8,820,773 B2* | 9/2014 | Ferree, Jr. | ................ B62B 3/02 |
| | | | 280/638 |
| 9,663,037 B2* | 5/2017 | Randleman | ........... B60R 1/0605 |
| 9,809,241 B2* | 11/2017 | Polidoros | ................ B62B 3/108 |
| 9,908,548 B1* | 3/2018 | Yu | ........................... B62B 3/108 |
| 10,150,492 B2 | 12/2018 | Yu et al. | |
| D842,575 S | 3/2019 | Yu et al. | |
| D855,921 S | 8/2019 | Yu et al. | |
| 2002/0105169 A1* | 8/2002 | Dahl | ...................... B62B 1/002 |
| | | | 280/651 |

* cited by examiner

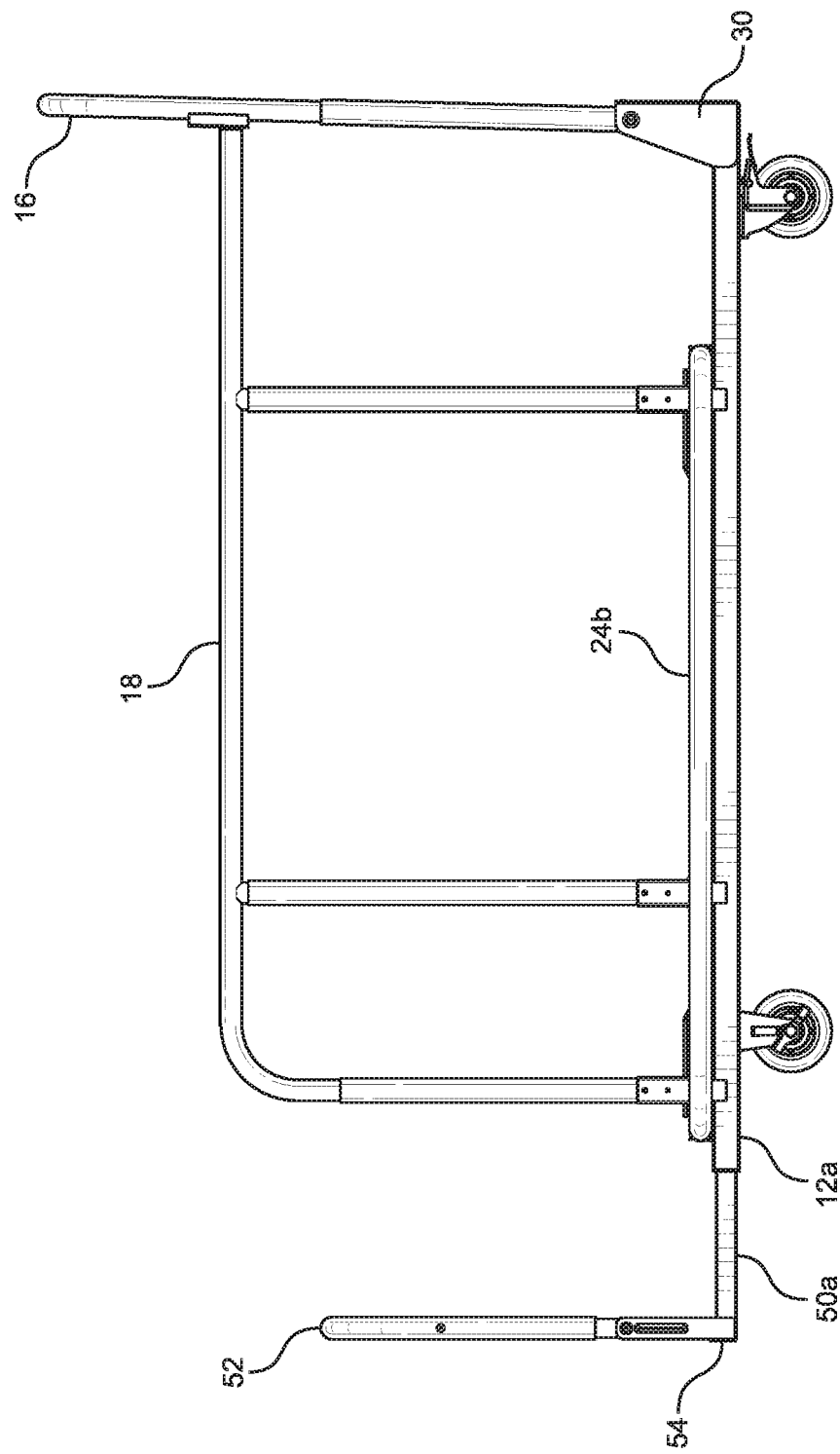

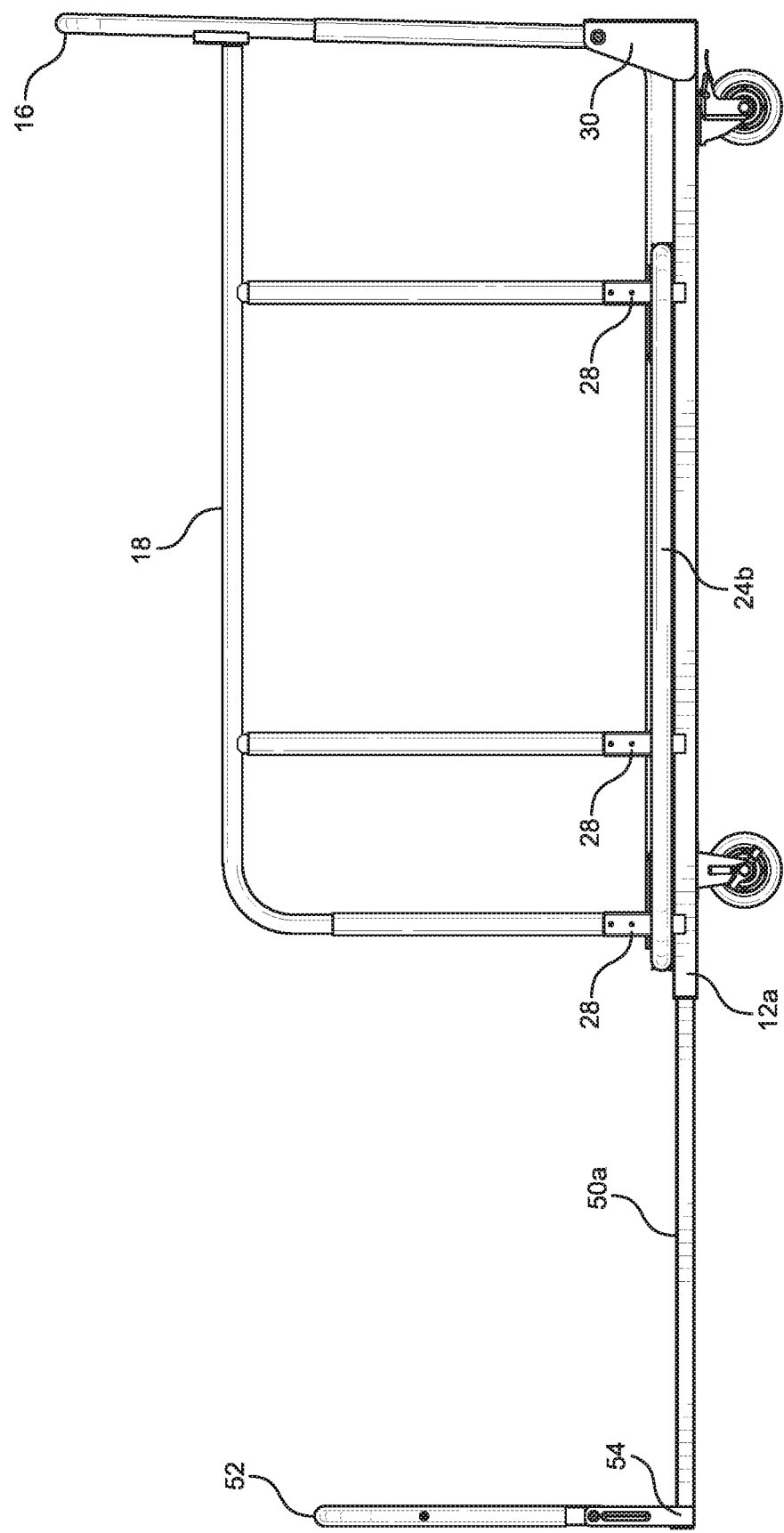

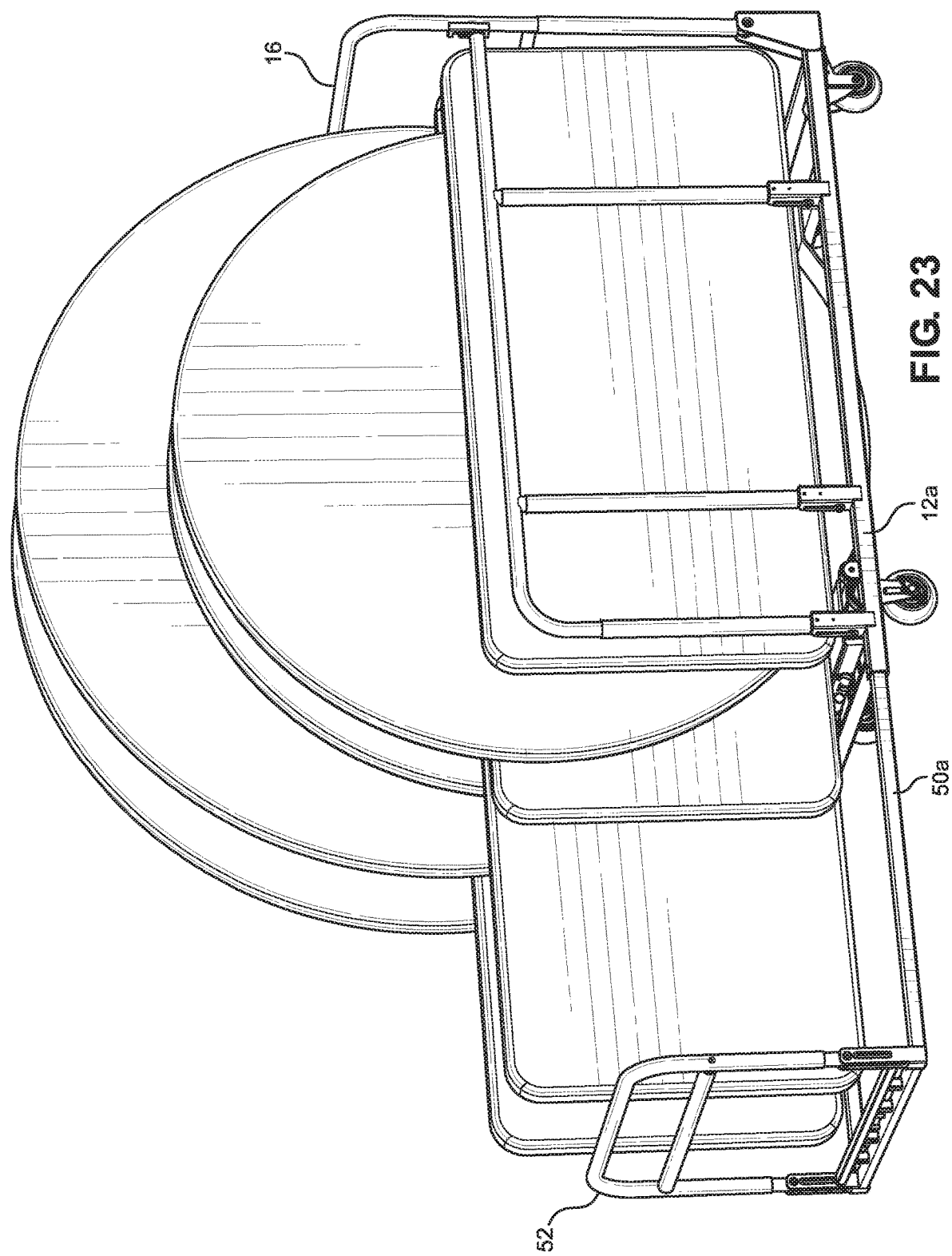

EXTENSION GATE FOR TROLLEY

FIELD

This present disclosure relates to trolleys and carts. More particularly, the disclosure relates to an improved trolley construction that features an extension gate that enables the length of the trolley to be easily adjusted, and an adjustable load stabilizer that aids in stabilizing a less than full load on the trolley.

BACKGROUND

Trolleys or carts of the type used to store and transport folding furniture such as folding tables desire improvement.

The present disclosure relates to an improved multifunctional folding trolley.

Conventional trolleys are of fixed size, heavy, and are complicated to assemble and disassemble. Conventional trolleys are not foldable and require substantial space for storage, unless disassembled for storage. The complication of assembly and disassembly renders this option undesirable.

In addition, conventional trolleys for use with folding tables are typically made to fit a certain size and shape table. Thus, if one has a variety of table sizes and configurations to transport, one typically must have several different trolleys.

With the development of market demand, a new type of trolley is desired, the features of which are multifunctional, easy to assemble, lightweight, and foldable so as to be easily storable without disassembly. The trolley in particular features an extension gate that enables the length of the trolley to be easily adjusted. The trolley also includes an adjustable load stabilizer that aids in stabilizing a less than full load on the trolley.

SUMMARY

The disclosure advantageously provides improved trolley structures configured for use to carry folding tables of a variety of configurations and sizes.

In one aspect, a trolley according to the disclosure includes a loading end, a trolley frame, and an extension gate adjustably connected to the trolley frame so as to be adjustable relative to the loading end of the trolley in a length direction of the trolley. The extension gate includes an elongate member slidingly disposed on the trolley frame and a rotatable portion that is foldable relative to the elongate member and lockable in an upright position by a lock. The rotatable portion may be positioned in an extended position from the loading end of the trolley, in a retracted position adjacent the loading end of the trolley, and in positions intermediate to the extended position and the retracted position. The elongate member may slide in a first direction to extend the rotatable portion away from the loading end of the trolley and in a second direction to retract the rotatable portion toward the loading end of the trolley.

In another aspect, a trolley according to the disclosure includes a trolley having a loading end, a trolley frame, and an adjustable load support that is removably positionable to stabilize goods loaded on the trolley when the goods do not substantially span the width of the trolley. The adjustable load support includes two spaced apart sets of receivers across the width of the trolley, and an adjustably positionable stabilizer having one end selectively positionable into the receivers of one of the sets of receivers and an opposite end selectively positionable into the receivers of the other one of the sets of receivers to vertically position the stabilizer on the trolley.

Trolleys according to the disclosure are multifunctional, foldable, and easily assembled and disassembled. Trolleys according to the disclosure have features such as an extension gate that enables the length of the trolley to be easily adjusted. Trolleys according to the disclosure also include an adjustable load stabilizer that aids in stabilizing a less than full load on the trolley.

BRIEF DESCRIPTION OF THE DRAWINGS

Further advantages of the disclosure are apparent by reference to the detailed description in conjunction with the figures, wherein elements are not to scale so as to more clearly show the details, wherein like reference numbers indicate like elements throughout the several views, and wherein:

FIGS. 4 and 5 are side views showing the front adjustable extension gate in other positions.

FIG. 23 shows the trolley loaded to carry a mixture of round and rectangular tables of the various sizes.

DETAILED DESCRIPTION

Figure 1:
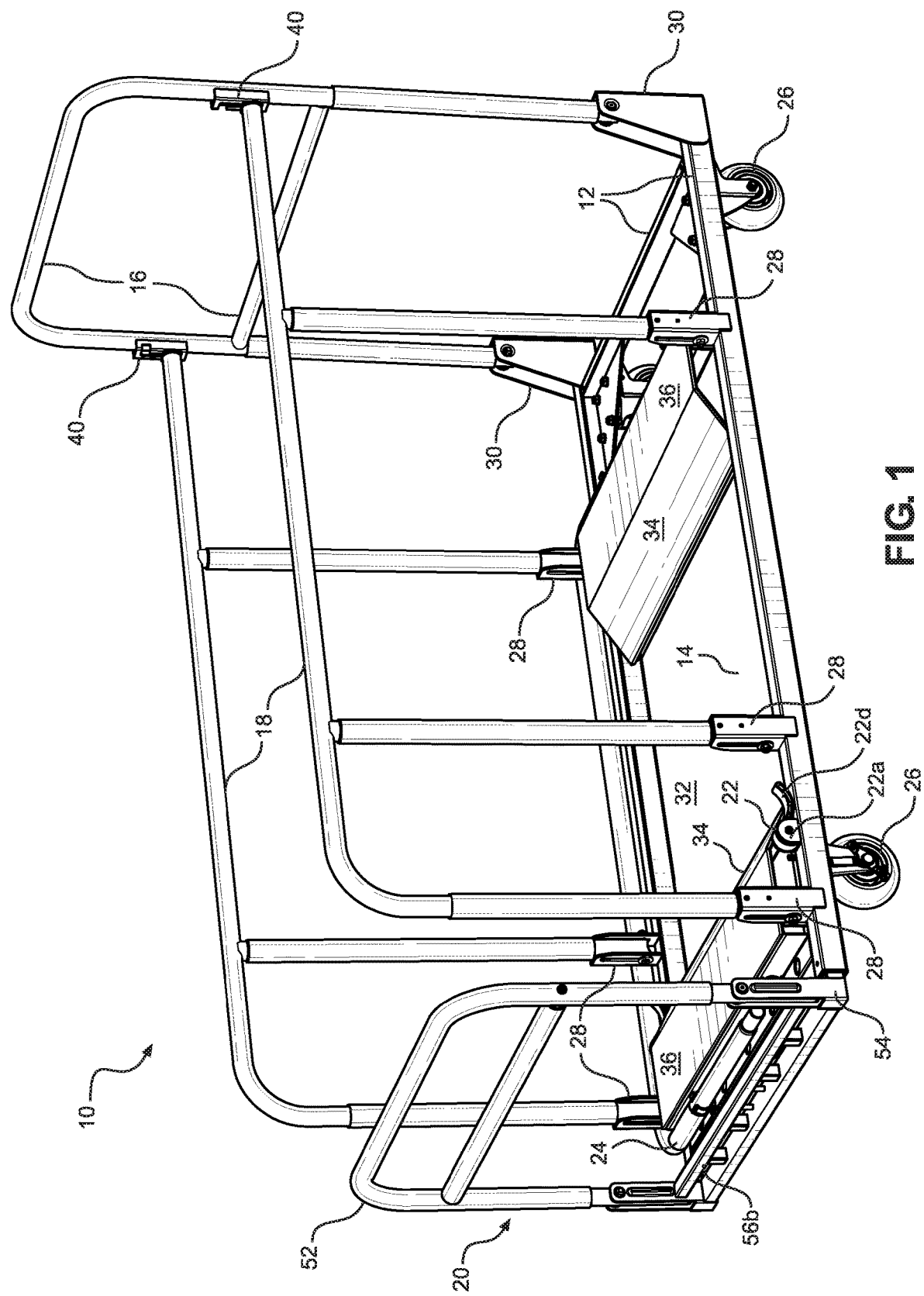
FIG. 1 is a perspective view of an erected foldable multifunctional trolley according to the disclosure.
Figure 2:
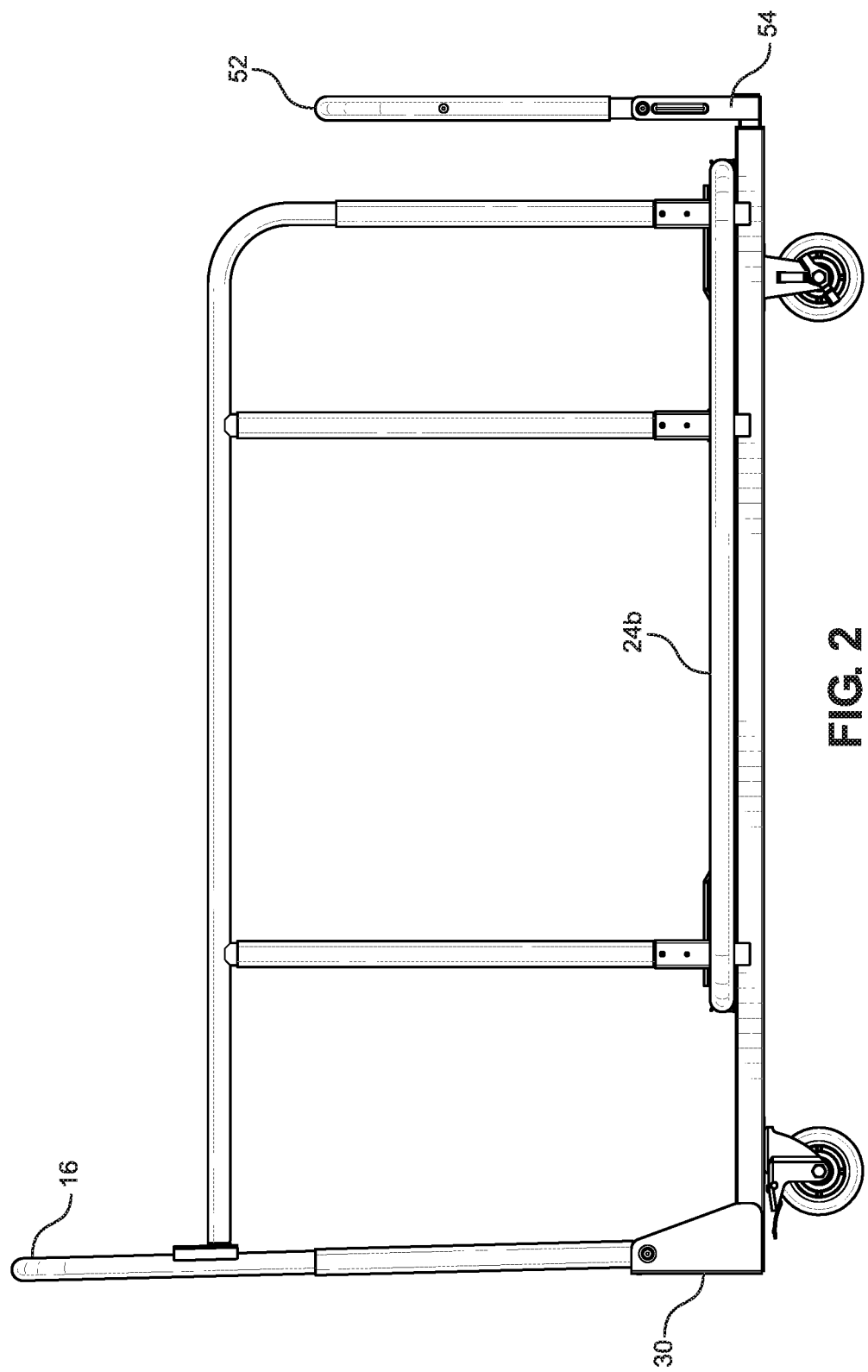
FIGS. 2 and 3 are side views of the trolley with a front adjustable extension gate thereof in a first position.
Figure 3:
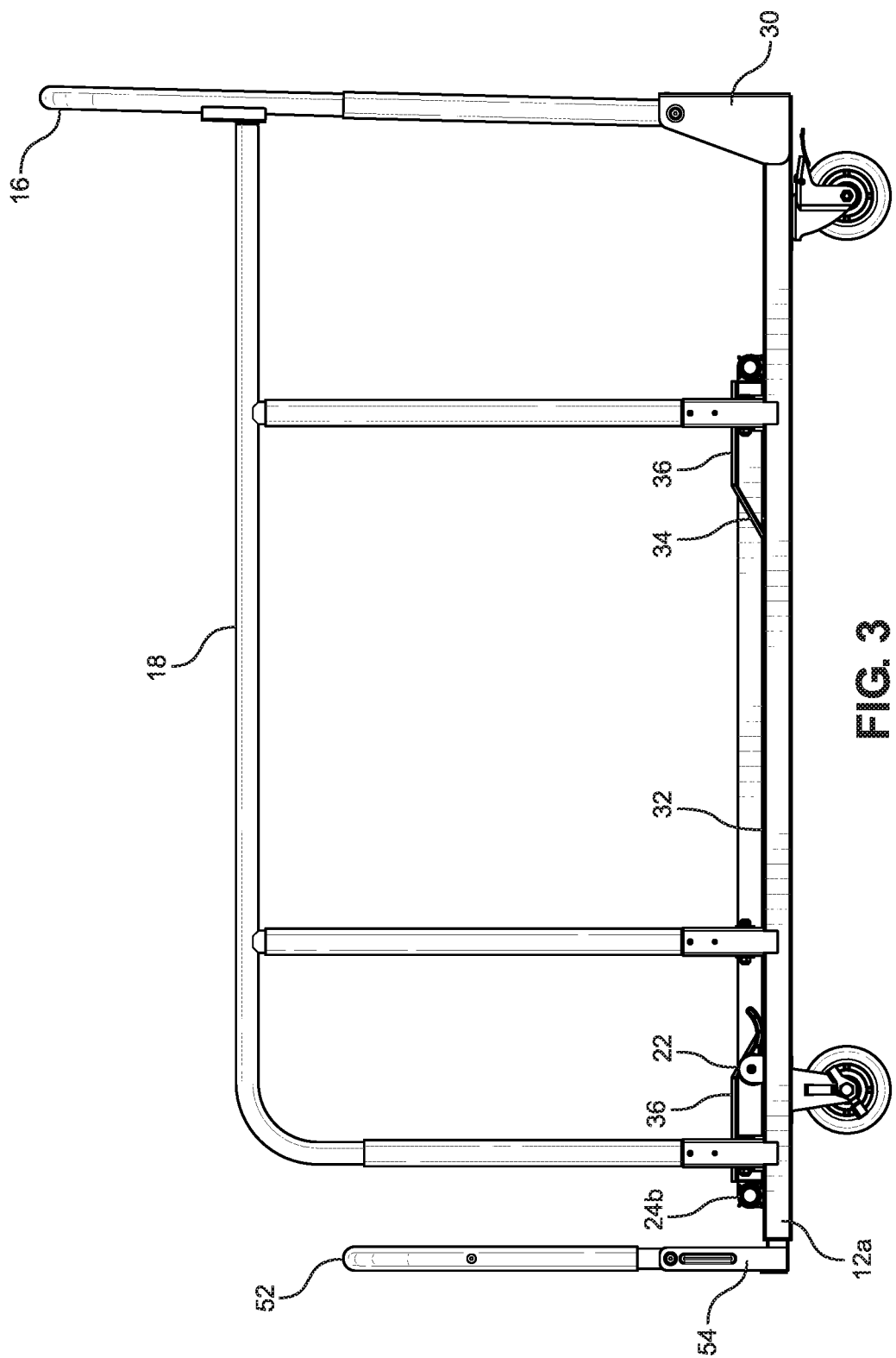
Figure 7:
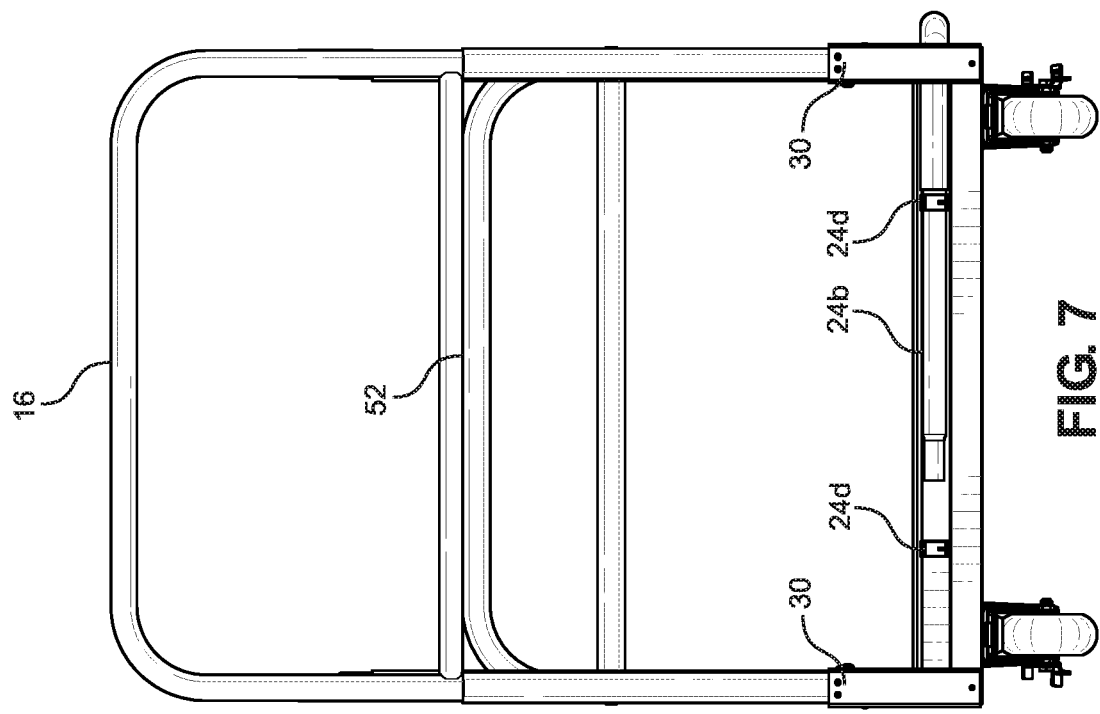
FIGS. 6 and 7 are end views of the trolley.
Figure 6:
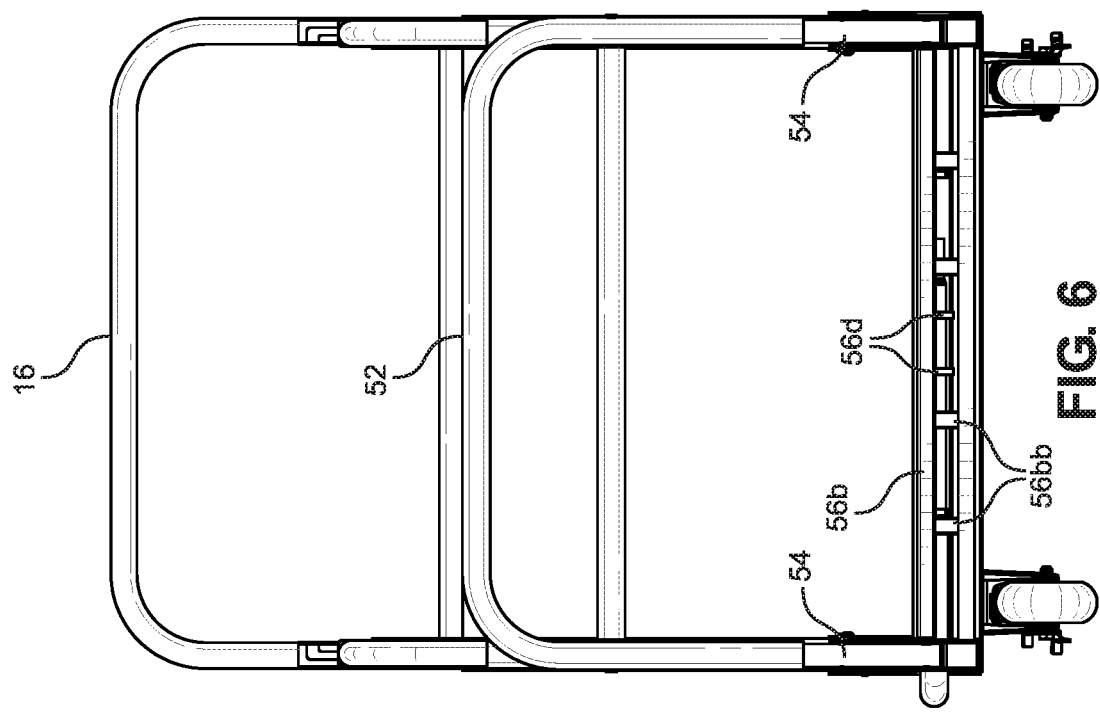

With initial reference to the drawings, the disclosure relates to a foldable multifunctional trolley 10. The appearance of the trolley 10 is also configured to be aesthetically pleasing and includes various ornamental aspects and features.

The trolley 10 includes a frame 12 supporting a floor 14, a foldable handle rack 16, side rails 18, an adjustably positionable extension gate 20, gate adjusters 22, and an adjustable load support 24. A plurality of wheels 26 are located on a bottom portion of the frame 12 to permit mobility of the trolley 10. The trolley 10 is advantageously configured to have improved structure, function and aesthetics. The components of the trolley 10 are desirably made of steel, with a powder coat finish for rust resistance.

Figure 9:
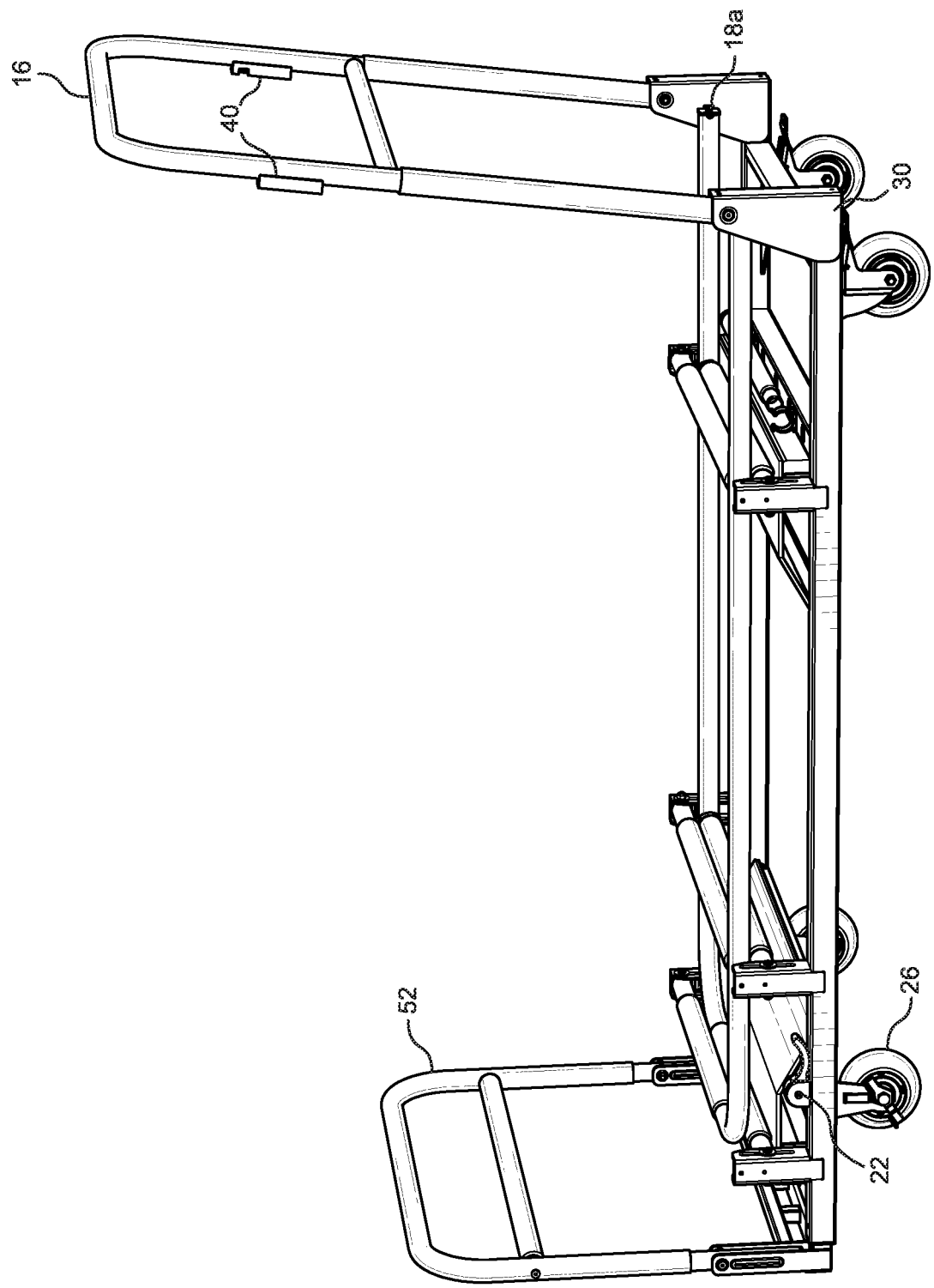

The frame 12 may be provided as by a plurality of frame members, preferably made of steel, welded or otherwise fixed together to provide the frame 12 in a rectangular or configuration. Side members 12a of the frame 12 are desirably tubular to slidingly receive the extension gate 20. The frame 12 may include floor supports that extend between the frame members for strengthening and supporting the floor 14. The frame 12 may also include rail mounts 28 for pivotally or foldably mounting the side rails 18 to the frame 12 so that the side rails may be securely maintained in an upright position for use, or folded for storage (FIG. 9).

Figure 11:
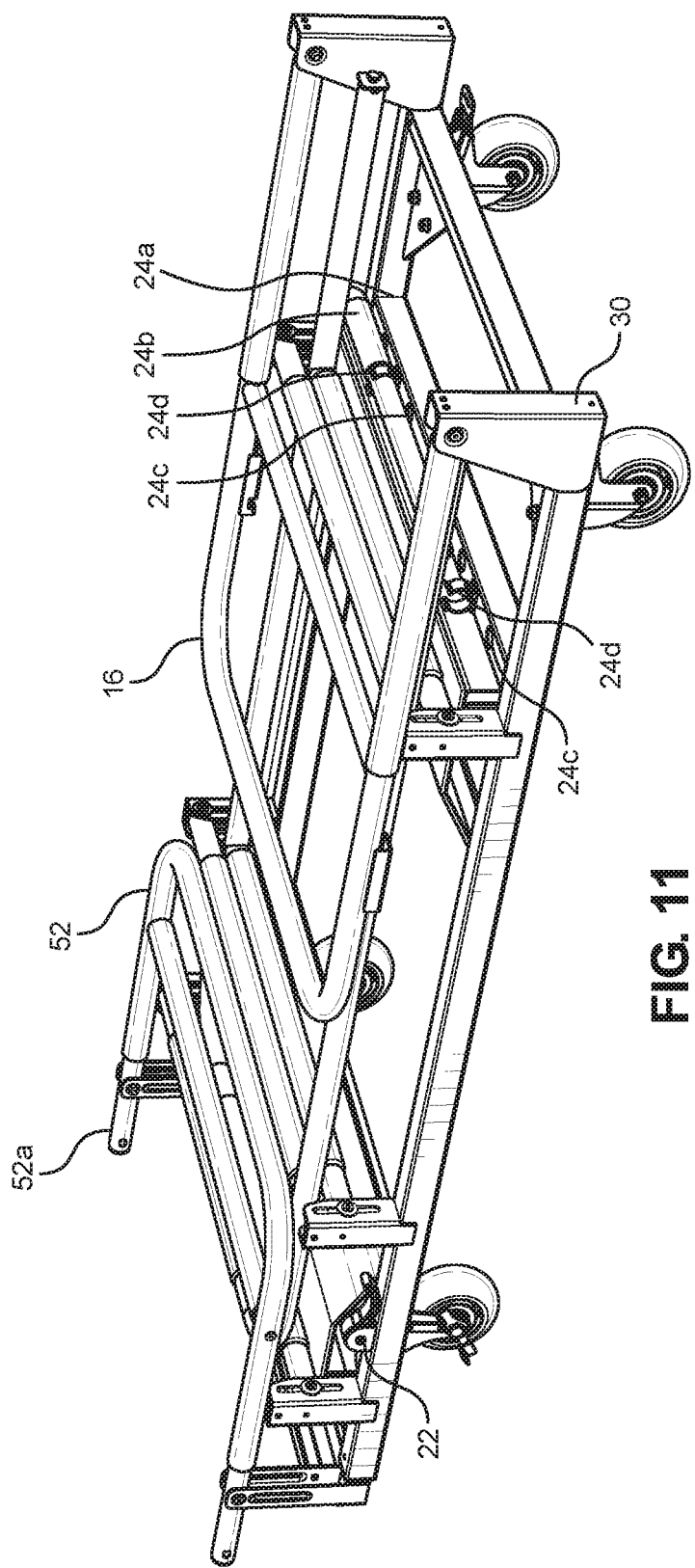

The frame 12 also includes handle mounts 30 for pivotally or foldably mounting the handle 16 to the frame 12 so that the handle 16 may be securely maintained in an upright position for use, or folded for storage (FIG. 11). The mounts 30 are configured to prevent collapse of the handle 16 under load.

Figure 18:
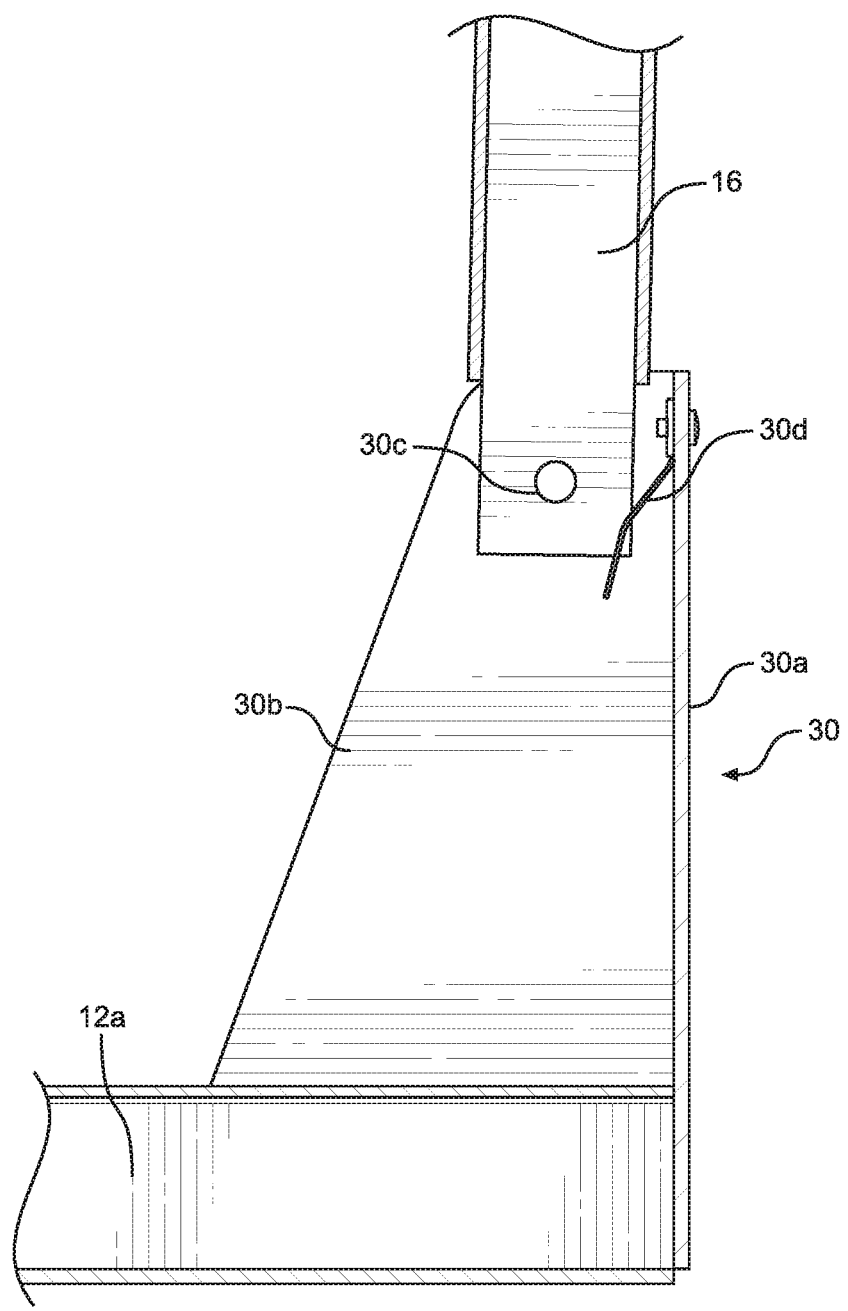
FIG. 18 is a close-up view of structure associated with a foldable handle rack component of the trolley for enabling folding of the handle rack.

As seen in detail in FIG. 18, the handle mounts 30 include a rigid back panel 30a and a hinge panel 30b on both sides of the back panel 30a. The lower end of the handle 16 is pivotally mounted to the hinge panels 30b by hinge pin 30c. The handle mounts 30 are desirably spring-loaded and include an elastic element such as a spring 30d fixed to the mount 30 and located to bear against the handle 16 to apply a force to urge the handle 16 towards the upright position. The elastic element may be a leaf spring or other spring, or torsion springs or other the like that exert a responsive force when pressured and relax back when the pressure is removed. Thus, when force is it is exerted force onto the handle 16, the spring 30d serves to maintain the handle 16 in the upright position.

The floor 14 is located adjacent a loading end of the frame 12 and is configured to have a planar or flat central portion 32 bounded on each side by angled ramp portions 34, which terminate at elevated flat portions 36. The elevated flat portions 36 are preferably of uniform height above the flat central portion 32.

Figure 19:
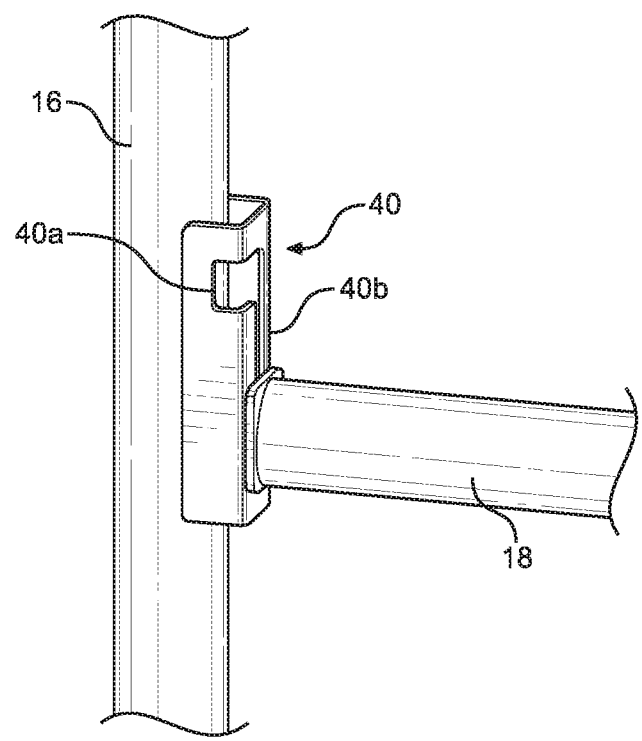
FIG. 19 is a close-up view of structure of the trolley for removably connecting side rails to the handle rack.

The handle rack 16 is used by a user to push the trolley 10 and is preferably of welded steel construction and is u-shaped in configuration. As previously noted, the handle 16 is pivotally or foldably mounted to the frame 12 by the handle mounts 30. To facilitate ease of assembly and disassembly, the handle rack 16 includes mounts 40 for releasably engaging and cooperating with the side rails 18 for quick connect and disconnect. With reference to FIG. 19, the mounts 40 are desirably configured with U-shaped slots 40a and 40b configured to receive correspondingly shaped latches on the rails 18a of the rails (FIG. 9).

The side rails 18 are preferably of welded steel construction. As previously noted, the side rails 18 are pivotally or foldably mounted to the frame 12 by the rail mounts 28.

Figure 17:
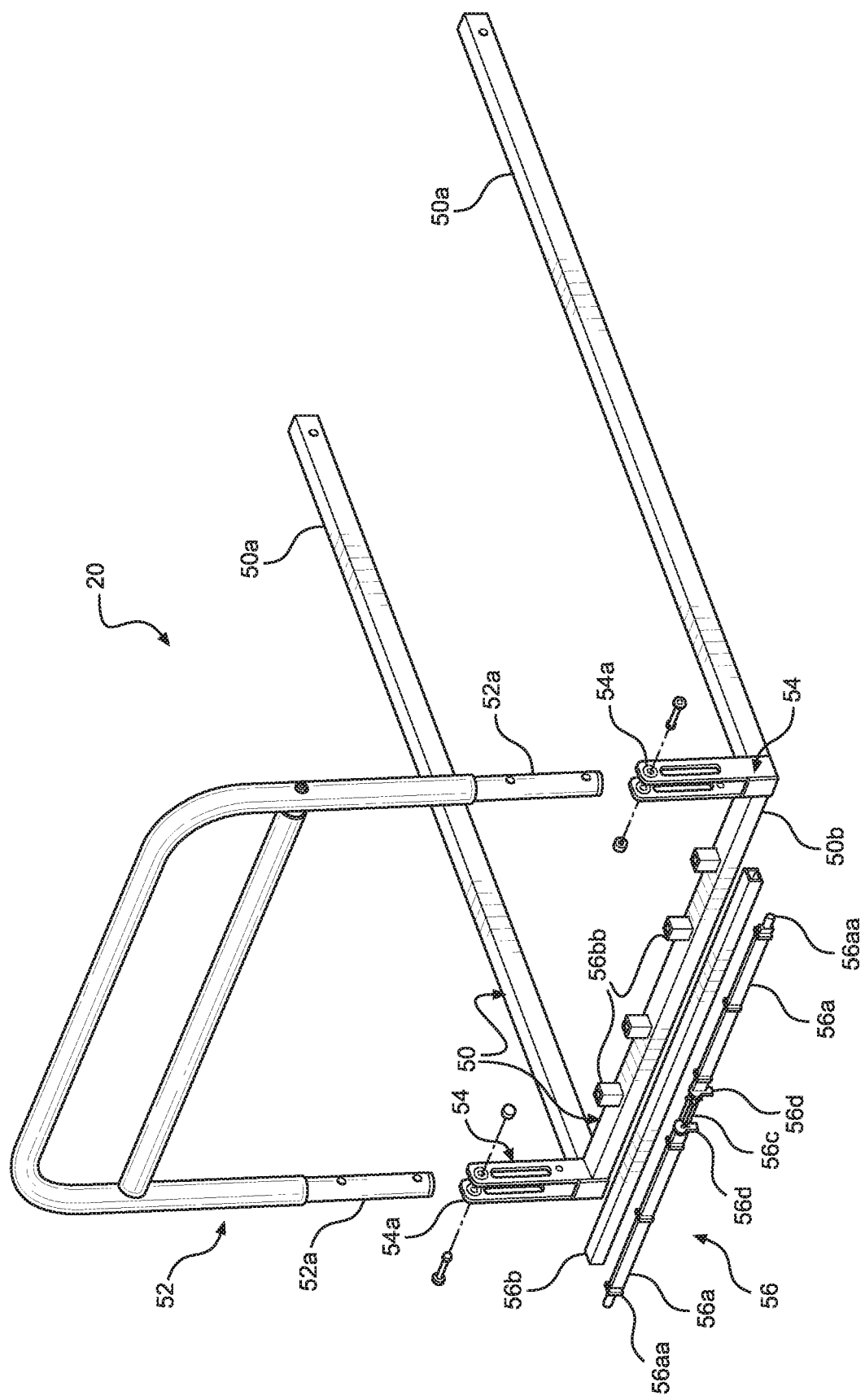
FIG. 17 is an exploded view of the front adjustable extension gate.

The adjustably positionable extension gate 20 is adjustably connected to the front of the frame 12 to slidingly adjust the extension of the gate 20 from the frame 12. With additional reference to FIG. 17. the extension gate 20 includes a U-shaped frame 50 having slidably positionable side members 50a and end member 50b. The side members 50a are configured to be slidingly disposed into the tubular side members 12a of the frame 12. A rotatable portion 52 is foldably mounted to the frame 50 by mounts 54 and locked in an upright position by a lock 56.

The rotatable portion 52 is u-shaped and includes lower ends 52a that pivotally engage the mounts 54. The mounts 54 may have spaced apart members 54a between which the lower ends 52a are received and pivotally mounted as by a fastener extending through aligned apertures of the mount 54 and the lower end 52a.

A lowermost portion of each of the lower ends 52a is engaged by the lock 56 to lock the rotatable portion 52 in an upright position. The lock 56 may include lateral arms 56a slidingly disposed within an enclosure 56b such that lock pins 56aa at the ends of the of the lateral arms 56a may be selectively extended and withdrawn from the ends of the enclosure 56b. The lock pins 56aa extend through aligned apertures of the lowermost portion of the mounts 54 and the lower ends 52a when the rotatable portion 52 is in the upright position. When the lock pins 56aa are withdrawn the rotatable portion 52 is unlocked and can be folded.

The arms 56a are urged apart by a spring or other bias member 56c located between the interior ends of the arms 56a within the enclosure 56b. The enclosure 56b is elevated by supports 56bb to a height so that the height of the upper surface of the enclosure 56b is no higher than the height of the elevated flat portions 36, and preferably slightly below.

Levers 56d at the interior ends of the arms 56a extend below the enclosure 56b and may be manipulated by a user to overcome the bias of the spring 56c and urge the arms 56a toward one another to disengage the lock pins 56aa from the lower ends 52a of the rotatable portion 52 to unlock the rotatable portion 52 so that it is free to be pivoted. FIGS. 8-15 show the different orientations of the rotatable portion 52.

Figure 8:
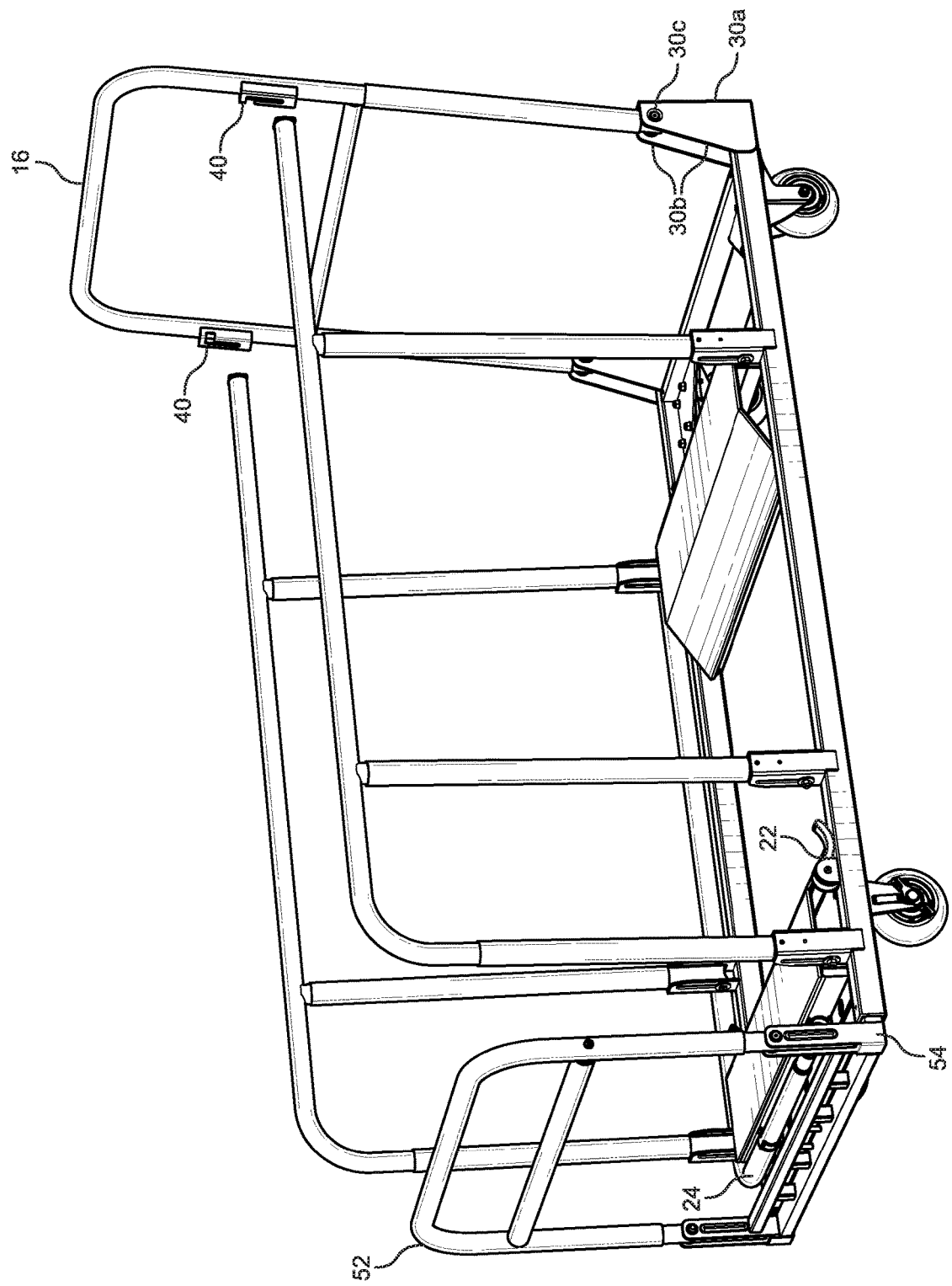
FIGS. 8-11 show positioning structures for folding components of the trolley.
Figure 10:
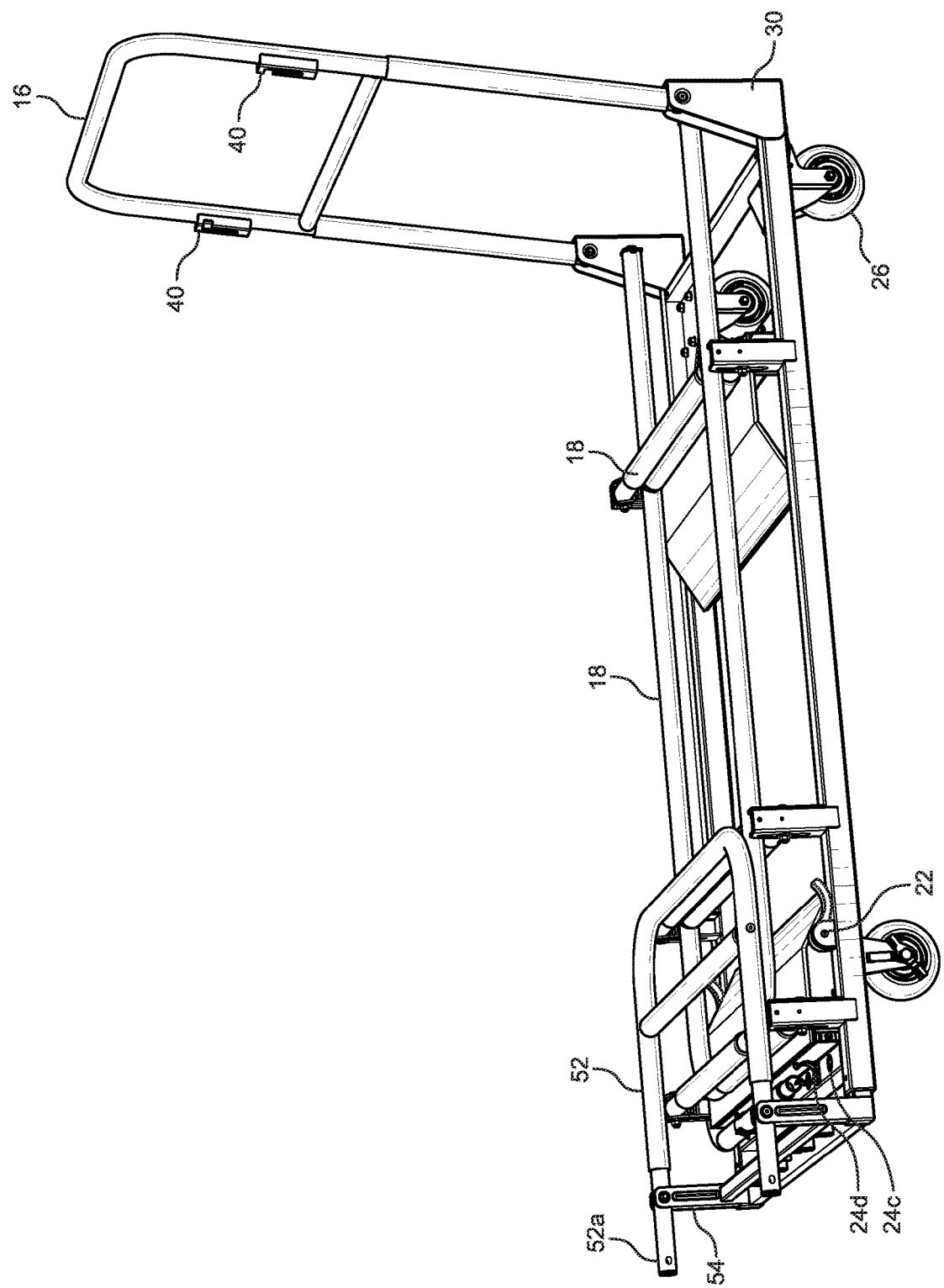
Figure 12:
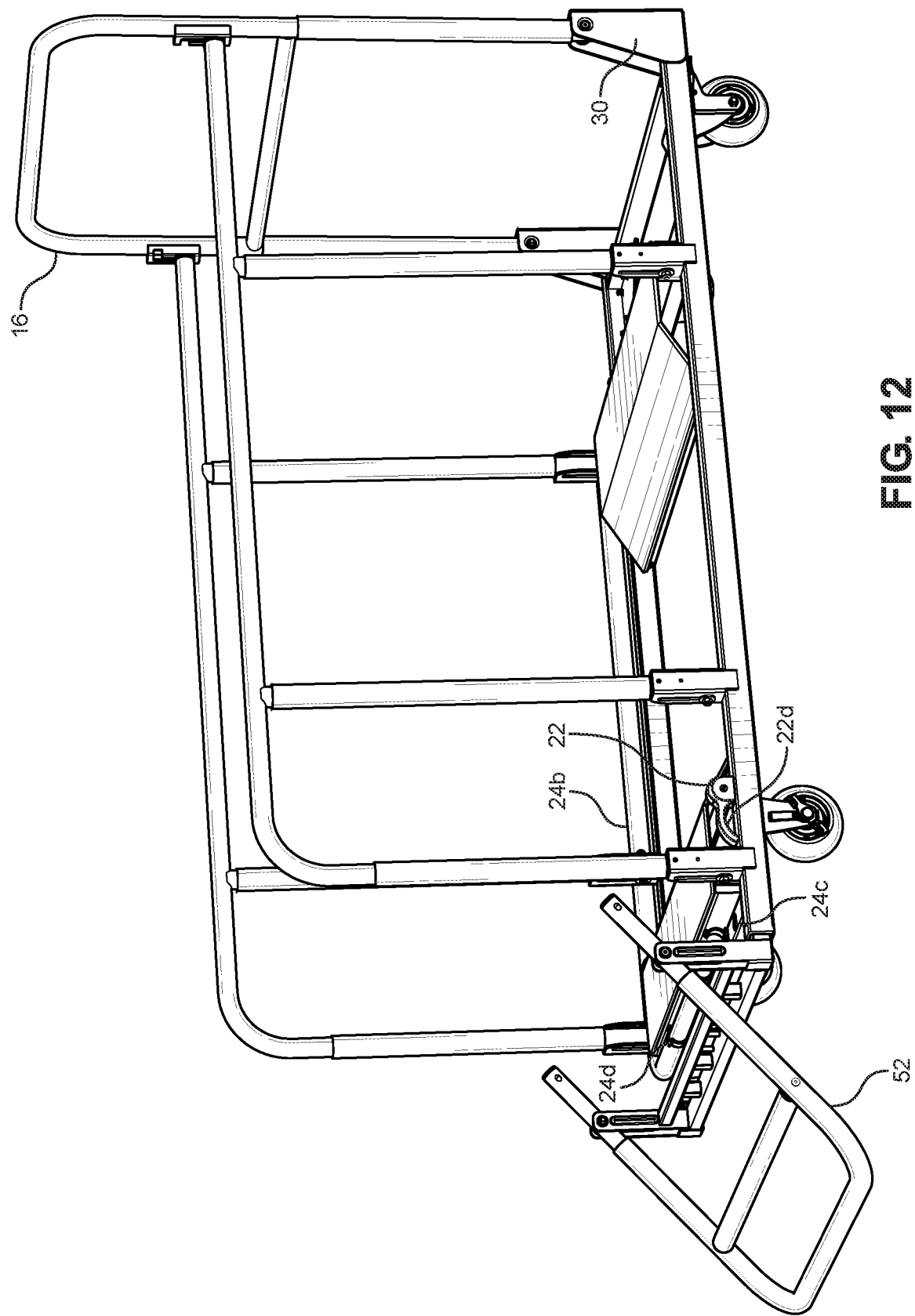
FIGS. 12-14 depict the trolley configured to load round tables thereon and the loading of round tables thereon.
Figure 13:
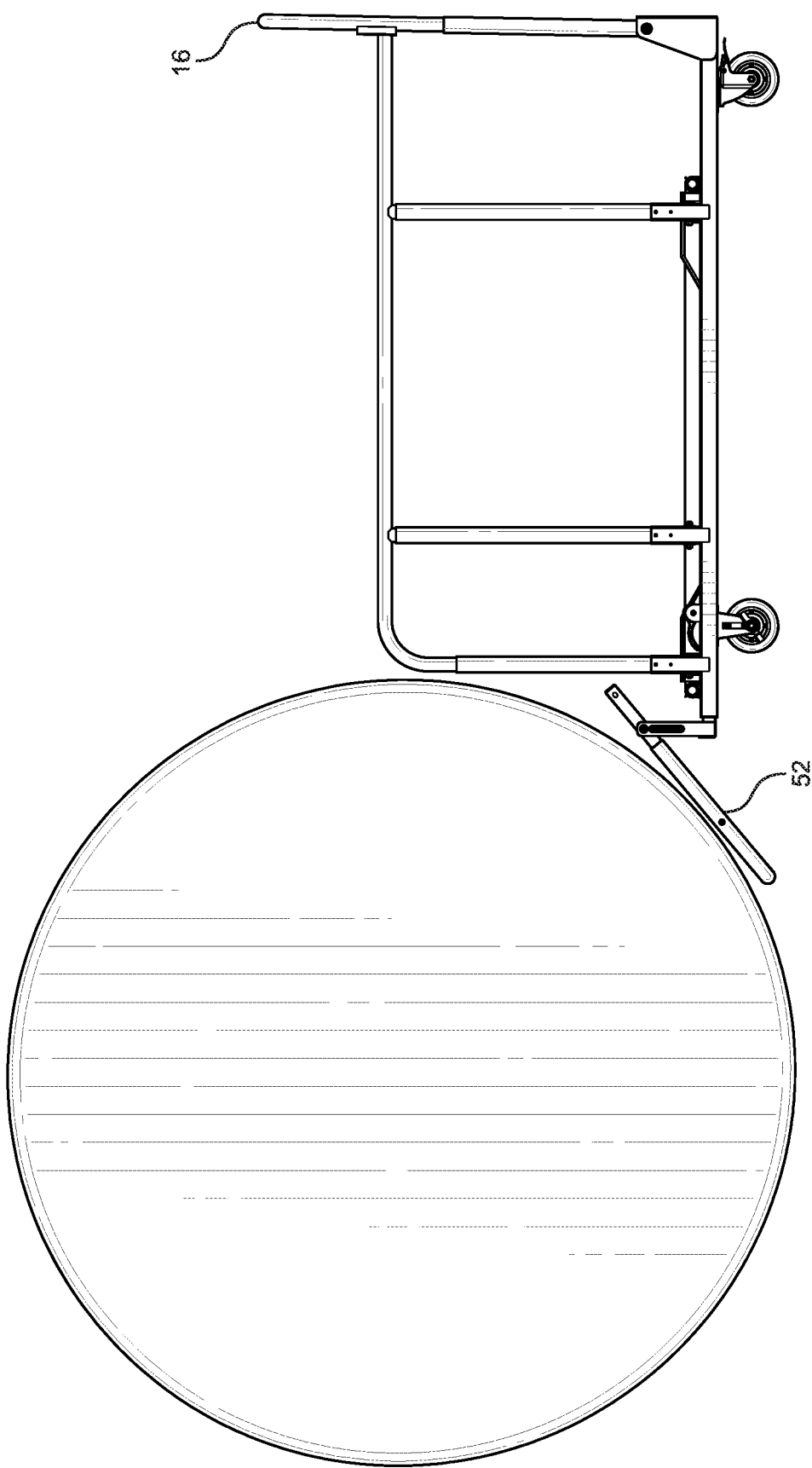
Figure 14:
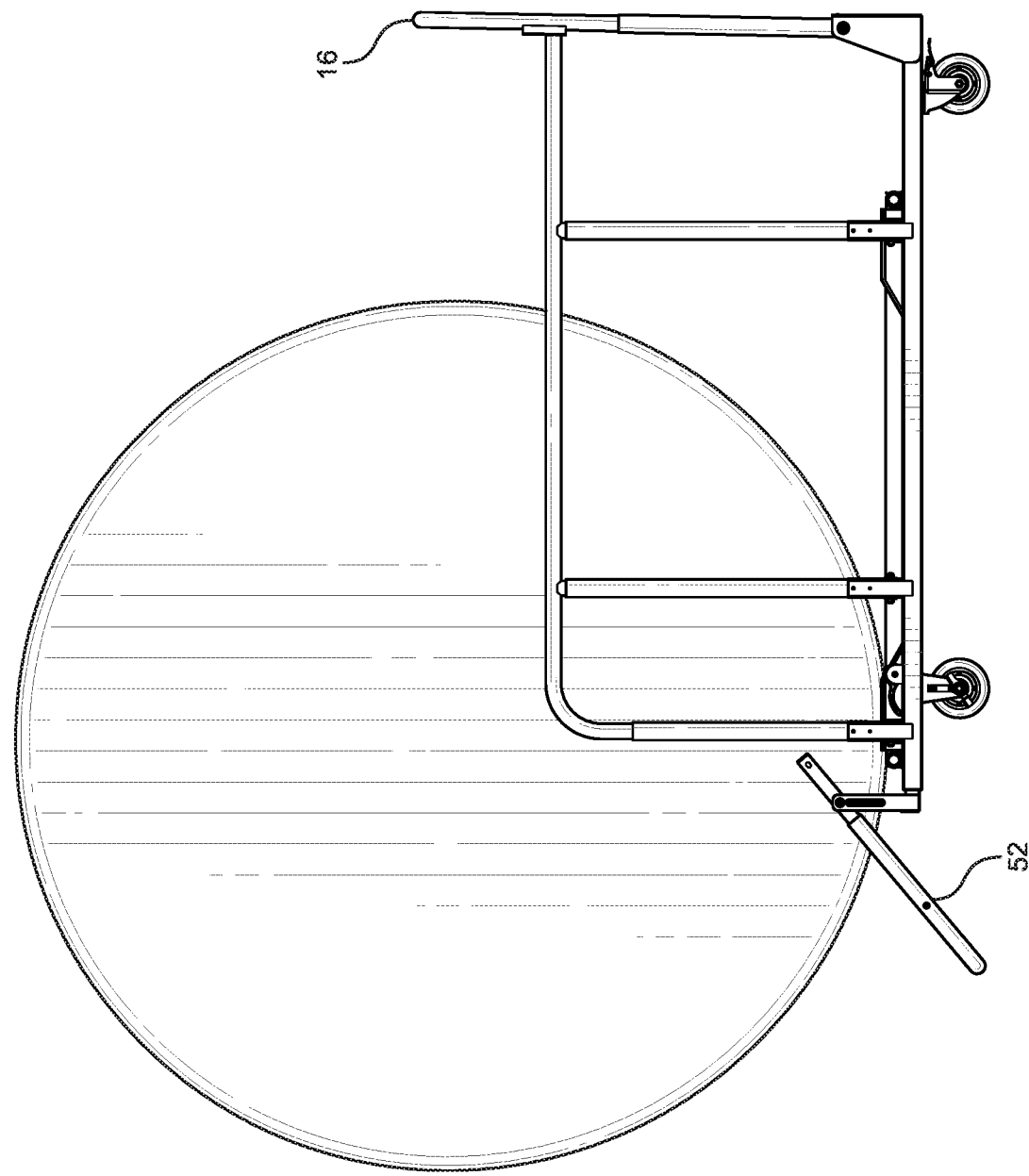
Figure 15:
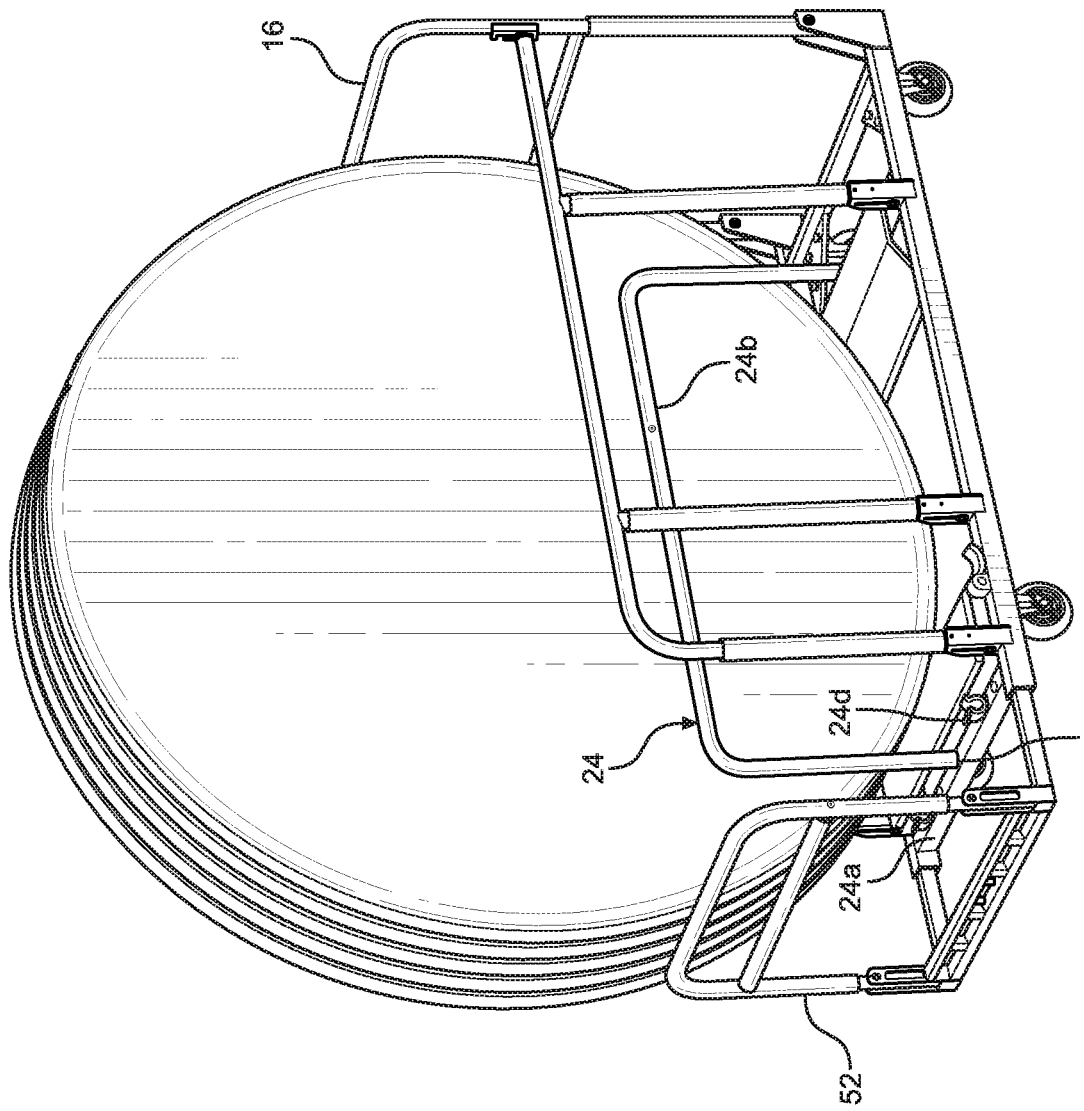
FIG. 15 shows the trolley with a partial load of round tables, with an adjustable load support thereof positioned to support the partial load of round tables.
Figure 16:
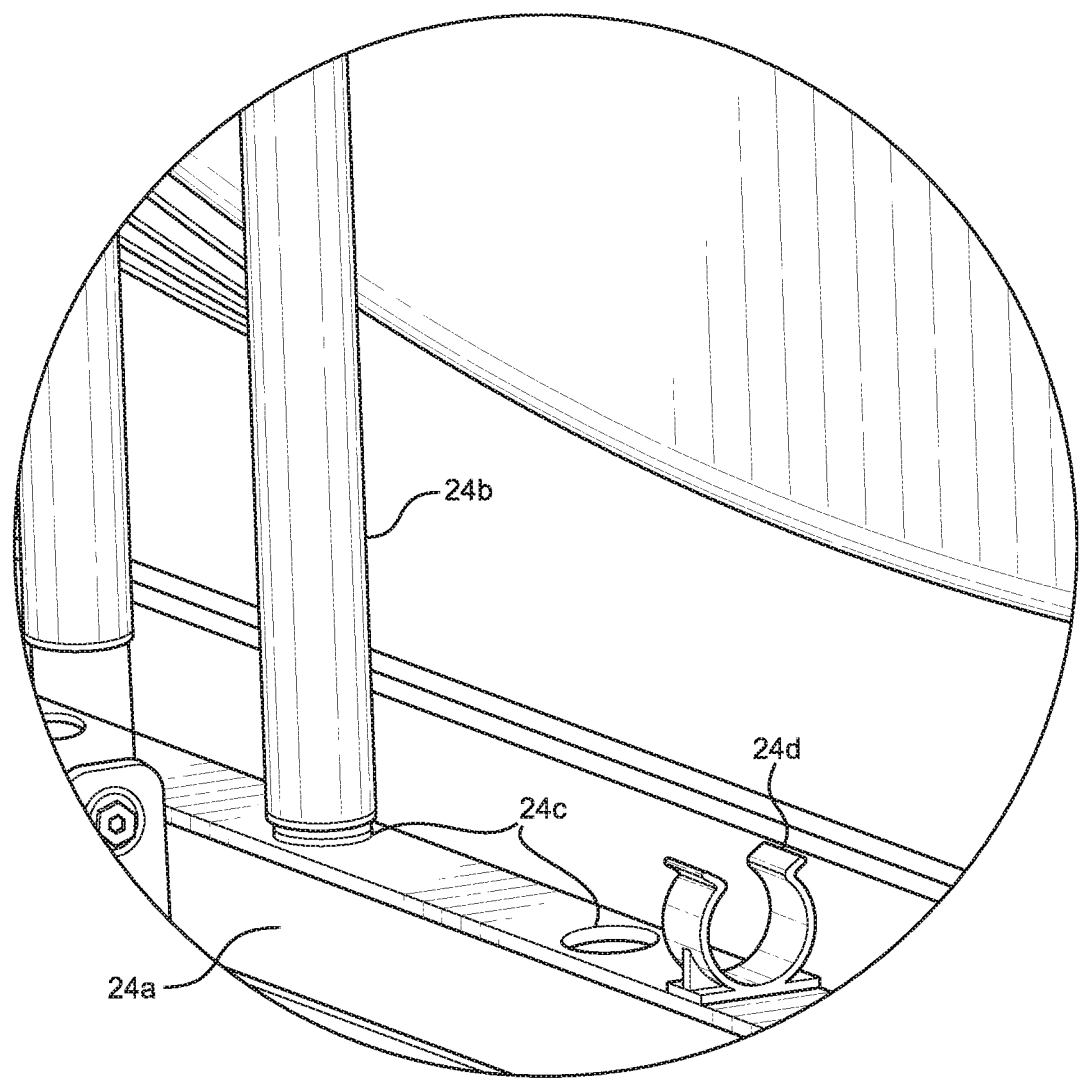
FIG. 16 is a detailed view of aspects of the adjustable load support.

FIGS. 8-9 and 15 show the rotatable portion 52 locked in the upright position. FIGS. 10-11 show the rotatable portion 52 folded backward onto the trolley 10 which orientation is useful for compactness and storage of the trolley 10. FIGS. 12-14 show the rotatable portion 52 folded forward to serve as a ramp which is useful for loading and unloading round tables from the trolley 10. After the table is loaded, the rotatable portion 52 is returned to and locked in the upright position as shown in FIG. 15.

The gate adjusters 22 located on the side members 12a of the frame selectively engage the side members 50a to enable the side members 50a to be selectively locked and unlocked from movement to provide the rotatable portion 52 at a desired level of extension from the frame 12. FIGS. 1-3 and 21-22 for example show the rotatable portion 52 fully retracted. FIGS. 4 and 15 show the rotatable portion 52 partially extended, and FIGS. 5 and 23 show the rotatable portion 52 fully extended.

Figure 20:
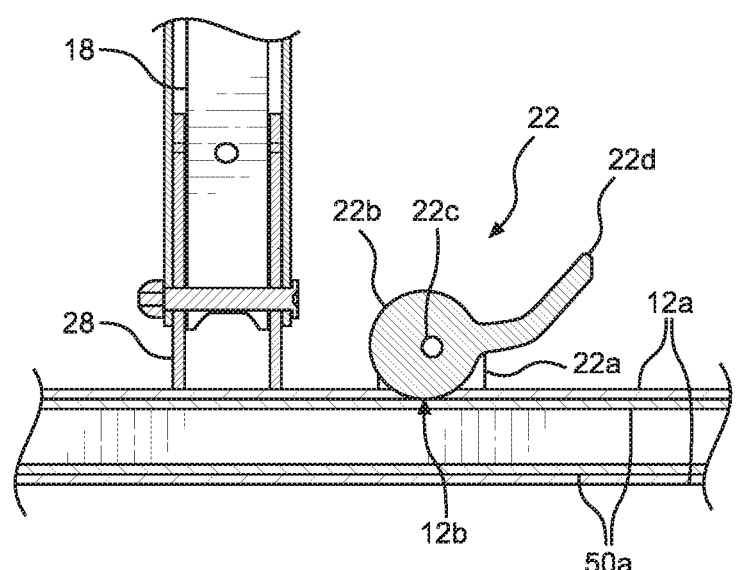
FIG. 20 is a cross-sectional view showing a latch for latching the front adjustable extension gate at a desired amount of extension.

With additional reference to FIG. 20, the gate adjusters 22 are mounted on the side members 12a above an aperture 12b formed through the top of the side members 12 of the frame 12. The gate adjusters 22 include a pair of spaced apart sides 22a and disk 22b eccentrically mounted to the sides 22a by a fastener 22c extending through aligned apertures of the sides 22a. The disk 22b is rotated by a lever 22d connected to the disk 22b.

When the lever 22d is rearward as shown in FIGS. 1 and 20, the disk 22b, due to the eccentric mounting, is not in locking contact with the top of the side member 50a, and the side member 50 may be slidingly moved relative to the side member 12a of the frame to extend or retract the extension gate 20. When the lever 22d is forward as shown in FIGS. 12 and 23, the disk 22b, due to the eccentric mounting, extends through the aperture 12b and is in locking contact with the top of the side member 50a and it is restrained from sliding movement.

The adjustable load support 24 is provided to help stabilize tables or other goods loaded on the trolley 10 when the quantity of tables or other goods do not substantially span the width of the trolley 10. For example, as shown in FIG. 15, the quantity of tables fills up only about half of the width of the trolley 10. The load support 24 is shown positioned to hold the tables upright so that the tables do not lean.

With reference to FIGS. 10, 11, 15 and 16, the adjustable load support 24 includes a pair of cross members 24a and a load stabilizer such as a u-shaped rail 24b. The cross-members 34a are located behind the ramp portions 34 and include a plurality of uniformly spaced apart receivers such as apertures 24c and rail clips 24d each sized to receive the rails 24b. The rail 24b may be positioned for use in an upright position by placing lower leg ends of the rail 24b into the apertures 24c to adjust the lateral location of the rail 24b. Desirably the apertures 24b closest to the outer edge of the load to be carried is selected. To stow the rail 24b, the rail 24b is laid horizontally so that the legs of the rail 24b are engaged with the clips 24d.

The trolley 10 is easily assembled by installing the handle rack 16, the handle rack 16, the side rails 18, and the gate 20 onto the frame 12 by use of the cooperating mounts, which are configured for quick cooperation, and requiring no tools. Likewise, the trolley 10 may easily be disassembled by reversing the assembly.

Figure 21:
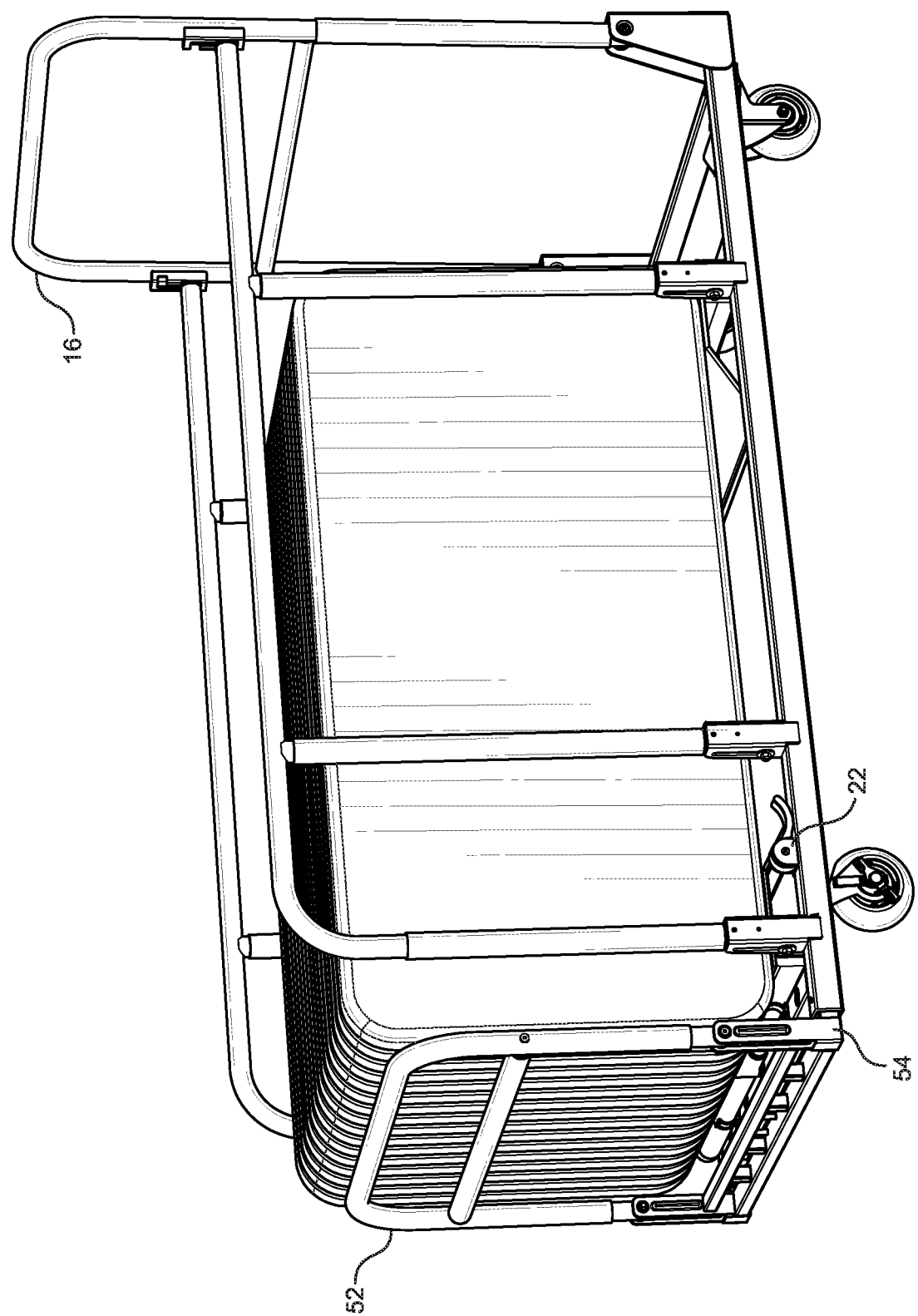
FIG. 21 shows the trolley loaded to carry rectangular folding tables.
Figure 22:
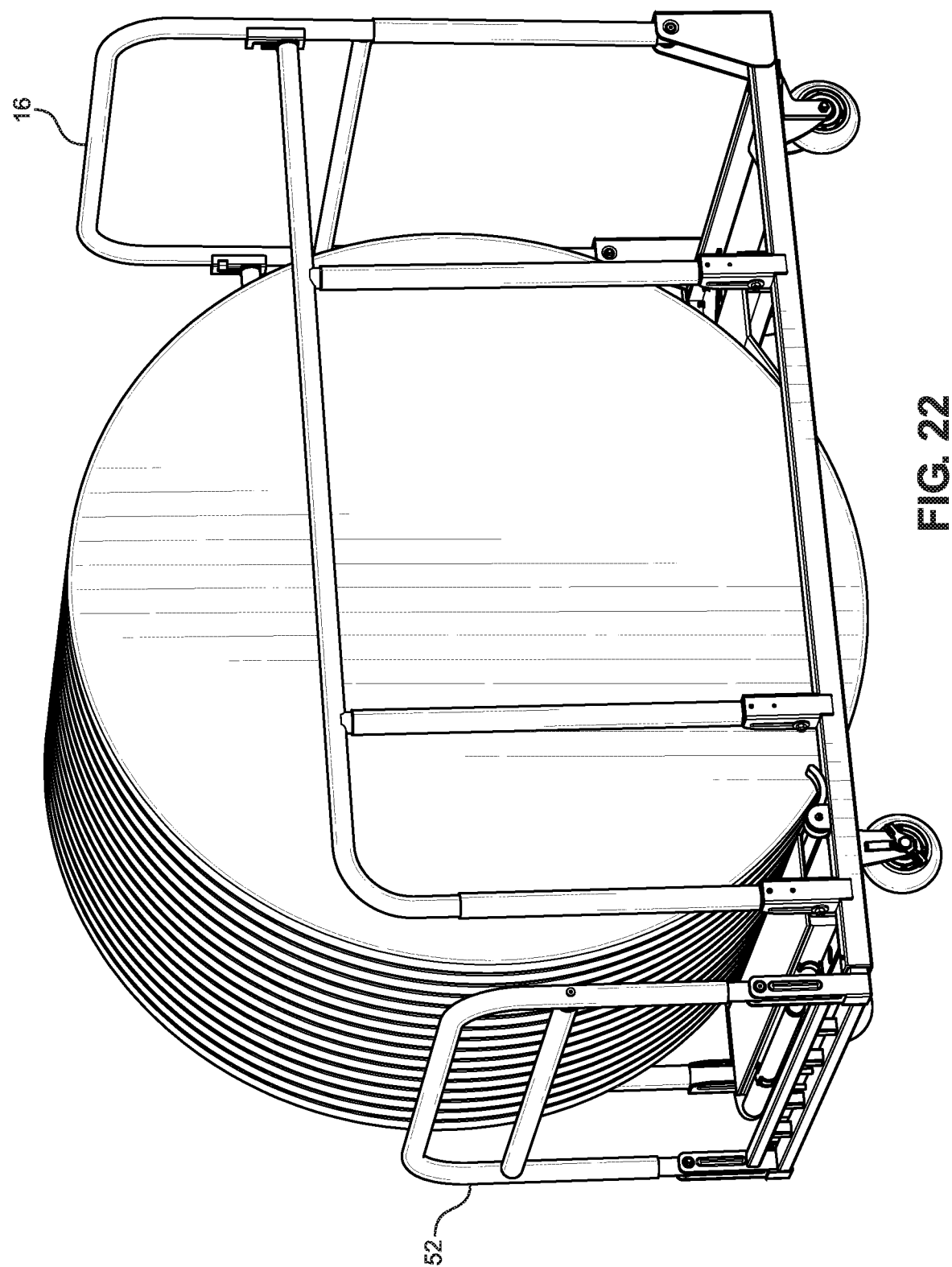
FIG. 22 shows the trolley loaded to carry round folding tables.

The trolley 10 is also advantageously configured to be multifunctional and adaptable to carry a variety of loads. In particular, the trolley 10 is configured for use with folding tables. Conventional trolleys for use with folding tables are typically made to fit a certain size and shape table. The trolley 10 is advantageously configured to be adaptable to carry both round and rectangular tables of a variety of sizes. For example, FIGS. 21-23 show the trolley 10 adjustably configured to carry round and rectangular tables of a variety of sizes. As shown, the adjustable extension of the extension gate 20 enables the trolley 10 to be configured to the size of the tables or other goods being carried. Likewise, as shown in FIG. 15, the adjustable load support renders the trolley 10 more suitable for use with less than a full load of goods.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

The invention claimed is:

1. A trolley configured for use to carry folding tables of a variety of sizes, the trolley comprising:
   a loading end;
   a trolley frame having a pair of tubular side members; and
   an extension gate adjustably connected to the trolley frame so as to be adjustable relative to the loading end of the trolley in a length direction of the trolley, the extension gate including:
      a pair of elongate members, each elongate member having a gate mount and being slidingly received by one of the tubular side members of the trolley frame,
      each elongate member having a rotatable portion including depending legs pivotally mounted to the gate mount, the rotatable member being foldable relative to the elongate member and positionable in an extended position from the loading end of the trolley, in a retracted position adjacent the loading end of the trolley, and in positions intermediate to the extended position and the retracted position,
      the elongate member being slidable in a first direction to extend the rotatable portion away from the loading end of the trolley and in a second direction to retract the rotatable portion toward the loading end of the trolley, and
      the rotatable member being lockable in an upright position by a lock and foldable forward from the upright position to serve as a ramp, the lock having a pair of lateral arms aligned end to end, wherein the lateral arms may be extended away from one another to lockingly engage the depending legs of the rotatable portion to lock the rotatable portion in the upright position and retracted toward one another out of engagement with the depending legs to unlock the rotatable portion.

2. The trolley of claim 1, wherein the trolley frame includes a tubular side member and the elongate member of the extension gate is slidingly received by the tubular side member.

3. The trolley of claim 2, further comprising a gate adjuster mounted on the tubular side member by a mount adjacent an aperture formed through the tubular side member, the gate adjuster having a cam rotatably and eccentrically mounted to the mount, wherein the cam is rotatable to a first orientation to extend through the aperture and be in locking contact with the elongate member and is rotatable to a second orientation to not be in locking contact with the elongate member.

4. The trolley of claim 1, wherein the trolley includes a floor having a planar central portion bounded on each side by angled ramp portions which terminate at elevated flat portions.

5. The trolley of claim 1, wherein the lateral arms include lock pins at their distal ends and the depending legs include passages which receive the lock pins when the lateral arms are lockingly engaged with the depending legs.

6. The trolley of claim 5, wherein the mounts include passages through which the lock pins of the lateral arms pass when the lateral arms are lockingly engaged with the depending legs.

7. The trolley of claim 6, further comprising a bias member located between the lateral arms and configured to urge the lateral arms away from one another.

8. The trolley of claim 7, further comprising levers located on the lateral arms which may be manipulated by a user to overcome the bias member and urge the lateral arms toward one another.

9. The trolley of claim 8, further comprising an enclosure located to enclose the lateral arms and out of which the lock pins extend when the lateral arms are lockingly engaged with the depending legs.

10. The trolley of claim 9, wherein the trolley includes a floor having a planar central portion bounded on each side by angled ramp portions which terminate at elevated flat portions, wherein the enclosure has an upper surface that is at a height at or below the elevated flat portions.

11. A trolley configured for use to carry folding tables of a variety of sizes, the trolley comprising:
   a loading end;
   a trolley frame; and
   an adjustable load support removably positionable to stabilize goods loaded on the trolley when the goods do not substantially span the width of the trolley, the adjustable load support comprising:
  two spaced apart sets of receivers across the width of the trolley; and
  an adjustably positionable stabilizer having one end selectively positionable into receivers of one of the sets of receivers and an opposite end selectively positionable into receivers of the other one of the sets of receivers to vertically position the stabilizer on the trolley.

12. The trolley of claim 11, wherein the trolley includes a floor having a planar central portion bounded on each side by angled ramp portions which terminate at elevated flat portions, wherein the sets of receivers are located outside of the angled ramp portions.

13. The trolley of claim 11, wherein the two spaced apart sets of receivers comprise a pair of cross members mounted across the width of the trolley and spaced apart from one another, each cross member having a plurality of the receivers.

14. A trolley configured for use to carry folding tables of a variety of sizes, the trolley comprising:
  a loading end;
  a trolley frame; and
  an extension gate adjustably connected to the trolley frame so as to be adjustable relative to the loading end of the trolley in a length direction of the trolley, the extension gate including:
    an elongate member slidingly disposed on the trolley frame;
    a rotatable portion foldable relative to the elongate member and lockable in an upright position by a lock, wherein the rotatable portion may be positioned in an extended position from the loading end of the trolley, in a retracted position adjacent the loading end of the trolley, and in positions intermediate to the extended position and the retracted position,
  wherein the elongate member may slide in a first direction to extend the rotatable portion away from the loading end of the trolley and in a second direction to retract the rotatable portion toward the loading end of the trolley; and
  an adjustable load support removably positionable to stabilize goods loaded on the trolley when the goods do not substantially span a width of the trolley, the adjustable load support comprising:
    a pair of cross members mounted across the width of the trolley and spaced apart from one another, each cross member having a plurality of receivers and
    an adjustably positionable stabilizer having one end selectively positionable into the receivers of one of the cross members and an opposite end selectively positionable into the receivers of the other one of the cross members to vertically position the stabilizer on the trolley.

* * * * *